United States Patent
Lipson et al.

(10) Patent No.: US 7,113,673 B2
(45) Date of Patent: Sep. 26, 2006

(54) HIGH-INDEX CONTRAST DISTRIBUTED BRAGG REFLECTOR

(75) Inventors: Michal Lipson, Ithaca, NY (US); Vilson Rosa de Almeida, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 44 days.

(21) Appl. No.: 10/347,116

(22) Filed: Jan. 17, 2003

(65) Prior Publication Data

US 2004/0033019 A1 Feb. 19, 2004

Related U.S. Application Data

(60) Provisional application No. 60/382,676, filed on May 22, 2002, provisional application No. 60/382,686, filed on May 22, 2002, provisional application No. 60/375,959, filed on Apr. 25, 2002, provisional application No. 60/350,294, filed on Jan. 17, 2002.

(51) Int. Cl.
G02B 6/34 (2006.01)

(52) U.S. Cl. .......................... 385/37; 385/129; 385/132
(58) Field of Classification Search ................... 385/37, 385/129
See application file for complete search history.

(56) References Cited

U.S. PATENT DOCUMENTS

| | | | |
|---|---|---|---|
| 4,049,413 A * | 9/1977 | French .................... | 65/392 |
| 5,265,177 A | 11/1993 | Cho et al. ................. | 385/14 |
| 5,426,717 A * | 6/1995 | Bindloss et al. .......... | 385/129 |
| 5,585,957 A | 12/1996 | Nakao et al. ............. | 359/248 |
| 5,657,338 A | 8/1997 | Kitamura ................. | 372/50 |
| 5,668,900 A * | 9/1997 | Little et al. ............... | 385/37 |
| 5,748,349 A * | 5/1998 | Mizrahi .................... | 398/84 |
| 5,792,957 A | 8/1998 | Luder et al. .............. | 73/724 |
| 6,104,738 A | 8/2000 | Kitoh et al. ............... | 372/46 |
| 6,181,860 B1 | 1/2001 | Granestrand et al. ..... | 385/129 |
| 6,229,947 B1 | 5/2001 | Vawter et al. ............. | 385/132 |
| 6,233,375 B1 | 5/2001 | Lang et al. ................ | 385/14 |
| 6,253,015 B1 | 6/2001 | Ukrainczyk | |
| 6,310,995 B1 | 10/2001 | Saini et al. ................ | 385/28 |
| 6,498,873 B1 | 12/2002 | Chandrasekhar et al. | |
| 6,697,551 B1 | 2/2004 | Lee et al. | |
| 6,823,111 B1 * | 11/2004 | Jette et al. ................. | 385/37 |
| 2002/0118916 A1 | 8/2002 | Lee et al. | |
| 2002/0122615 A1 * | 9/2002 | Painter et al. ............. | 385/15 |
| 2003/0044118 A1 | 3/2003 | Zhou et al. | |
| 2003/0048971 A1 * | 3/2003 | Ionov ........................ | 385/10 |

(Continued)

FOREIGN PATENT DOCUMENTS

EP 0810454 12/1997

(Continued)

OTHER PUBLICATIONS

Jeff Hecht, "Understanding Fiber Optics," 1998, Prentice-Hall, 3rd ed., p. 166.*

(Continued)

Primary Examiner—Sung Pak
Assistant Examiner—James D. Stein
(74) Attorney, Agent, or Firm—Schwegman, Lundberg, Woessner & Kluth, P.A.

(57) ABSTRACT

A distributed Bragg reflector has a sectioned waveguide with a high index of refraction. The waveguide is disposed within a medium having a relatively low index of refraction. Each of the sections of the waveguide are coupled with a thin waveguide having a high index of refraction. In one embodiment, the wire and waveguide sections are formed of the same high index material.

30 Claims, 4 Drawing Sheets

U.S. PATENT DOCUMENTS

2003/0081902 A1     5/2003     Blauvelt et al.
2004/0037497 A1     2/2004     Lee

FOREIGN PATENT DOCUMENTS

| | | |
|---|---|---|
| EP | 0826988 | 3/1998 |
| JP | 55-115002 | 9/1980 |
| JP | 62-145208 | 6/1987 |
| JP | 2000-235125 | 8/2000 |
| WO | WO-01/57565 | 8/2001 |
| WO | WO-02/10815 | 2/2002 |
| WO | WO-03062883 A2 | 7/2003 |

OTHER PUBLICATIONS

Almeida, Vilson R., et al., "Lossless High-Index Contrast Distributed Bragg Reflector.", XP-002256239, School of Electrical and Computer Engineering, Cornell University., (May 19, 2002), 199-200.

Fritze, M., et al., "3D Mode Converters For SOI Integrated Optics", *Proceedings of the 2002 IEEE International SOI Conference*, (Oct. 7-10, 2002). 165-166.

Manlatou, Christina, et al., "Compact Mode-Size Converters For Efficient Coupling Between Fibers And Integrated Optical Waveguides", *Proceedings of the LEOS Summer Topical Meeting*, (Jul. 30-Aug. 1, 2001), 31-32.

Taillaert, Dirk, et al., "A High-Efficiency Out-of-Plane Fibre Coupler For Coupling To High Index Contrast Waveguides", *27th European Conference on Optical Communication, ECOC '01*, vol. 6 (Sep. 30, 2001), 30-31.

Fijol, J. J., et al., "Fabrication of silicon-on-insulator adiabatic tapers for low loss optical interconnection of photonic devices", *Photonics packaging and integration-Conference; 3rd Proceedings-SPIE The International Society for Optical Engineering*, San Jose, CA, (Jan. 2003), 14 Pages.

Kasaya, Kazuo, et al., "A Simple Laterally Tapered Waveguide for Low-Loss Coupling to Single-Mode Fibers", *IEEE Photonics Technology Letters*, 5(3), (Mar. 1993), 345-347.

Moerman, Ingrid, et al., "A Review on Fabrication Technologies for the Monolithic Integration of Tapers with III-V Semiconductor Devices", *IEEE Journal of selected Topics in Quantum Electronics*, 3(6), (Dec. 1997), 1308-1320.

\* cited by examiner

HIGH-INDEX CONTRAST DISTRIBUTED BRAGG REFLECTOR

REFERENCE TO RELATED APPLICATIONS

This application claims the benefit of priority under 35 U.S.C. 119(e) to U.S. Provisional Patent Application Ser. No. 60/350,294, filed Jan. 17, 2002, No. 60/375,959, filed Apr. 25, 2002, No. 60/382,686, filed May 22, 2002, and No. 60/382,676, filed May 22, 2002, all of which are incorporated herein by reference.

This application is also related to co-pending U.S. patent application SEr. No. (1153.073US1) entitled "High-Index Contrast Waveguide Coupler," and filed on the same date herewith, all of which is incorporated herein by reference.

FIELD OF THE INVENTION

The present invention relates to optical components, and in particular to a high index-contrast distributed Bragg reflector.

BACKGROUND OF THE INVENTION

Distributed Bragg reflectors (DBRs) are frequently used simply as reflectors. Other applications include vertical-cavity surface-emitting lasers (VCSELs), filtering and wavelength division multiplexing (WDM). The performance of DBRs (e.g., bandwidth and reflectivity) improves with the index contrast of the materials used to form the DBR. In other words, one material has a high index of refraction, and the other material has a low index. However, losses also increase as a consequence of light diffraction in the low-index regions. Conventional solutions for reducing losses are usually either reduction of index contrast, or an excessive shortening of the low-index region, both leading to a decrease in device performance. In order to provide high reflectivity in small sizes, diffraction losses must be reduced to a minimum.

SUMMARY OF THE INVENTION

A distributed Bragg reflector has a sectioned waveguide with a high index of refraction. The waveguide is disposed within a medium having a relatively low index of refraction. Each sections of the waveguide are coupled with a thin waveguide having a high index of refraction. In one embodiment, the wire and waveguide sections are formed of the same high index material.

In one embodiment, the high index thin waveguide has a much smaller diameter or width than the waveguide. The thin waveguide is surrounded by the low index material and is coupled to adjacent segments of the waveguide near the center of the segments. For a four period structure, three waveguide segments are coupled to each other and the remainder of the waveguide by four thin waveguides.

In one embodiment, the waveguide is formed from Si having an index of refraction of approximately 3.48, and the medium having a low index of refraction is air having an index of refraction of 1. With one set of geometries, the effective indices of refraction are calculated at 3.27 and 1.45 in the high and low index regions respectively. Losses vary with the width of the thin waveguide, as does the reflectivity. Optimizing the width of the thin waveguide provides high reflectivity and low losses for a distributed Bragg reflector.

DETAILED DESCRIPTION OF THE INVENTION

In the following description and the drawings illustrate specific embodiments of the invention sufficiently to enable those skilled in the art to practice it. Other embodiments may incorporate structural, logical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

Figure 1:
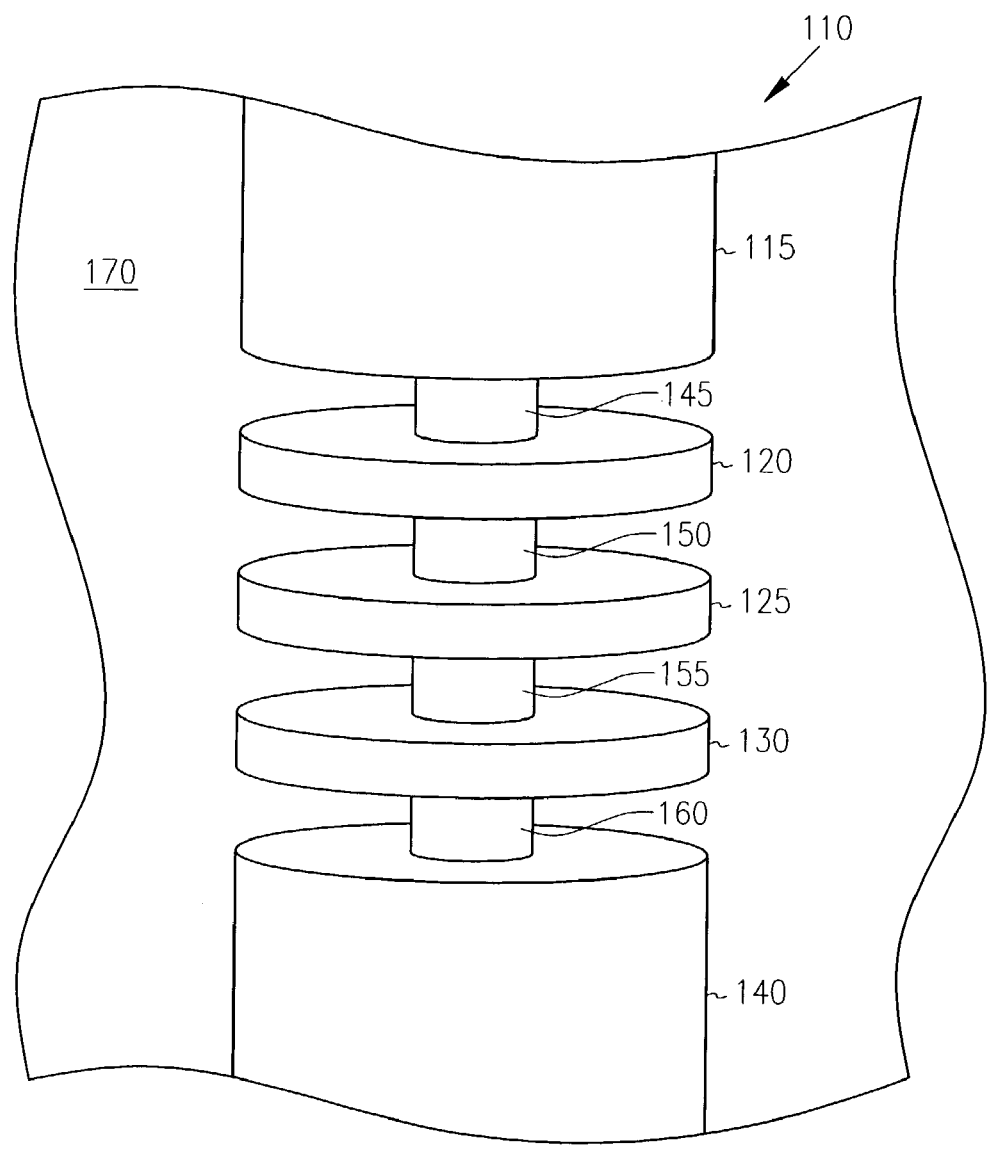
FIG. 1 is a perspective view of a thin waveguide coupled segmented vertical waveguide

A distributed Bragg reflector is shown generally at 110 in FIG. 1. A waveguide having a high index of refraction has a first end 115, and several sections of approximately equal diameter 120, 125, and 130 positioned between the first end 115 of the waveguide and a second end of the waveguide 140. Section 120 is coupled to the first end 115 by a thin waveguide section 145. Section 120 and 125 are coupled by a thin waveguide 150. Section 125 and section 130 are coupled by a thin waveguide 150, and section 130 and second end 140 are coupled by a thin waveguide 160. Each thin waveguide has a high index of refraction. The waveguide structure, including the ends of the waveguide, the sections, and thin waveguides are surrounded by medium 170 having a low index of refraction.

In one embodiment, the medium is air, having a index of refraction of 1. The waveguide structure is formed of silicon, and has an index of refraction of approximately 3.48. With one set of geometries, the effective indices of refraction are calculated at 3.27 and 1.45 in the high and low index regions respectively. Losses vary with the width of the thin waveguide, as does the reflectivity. Optimizing the width of the thin waveguide provides high reflectivity and low losses for a distributed Bragg reflector.

Figure 2:
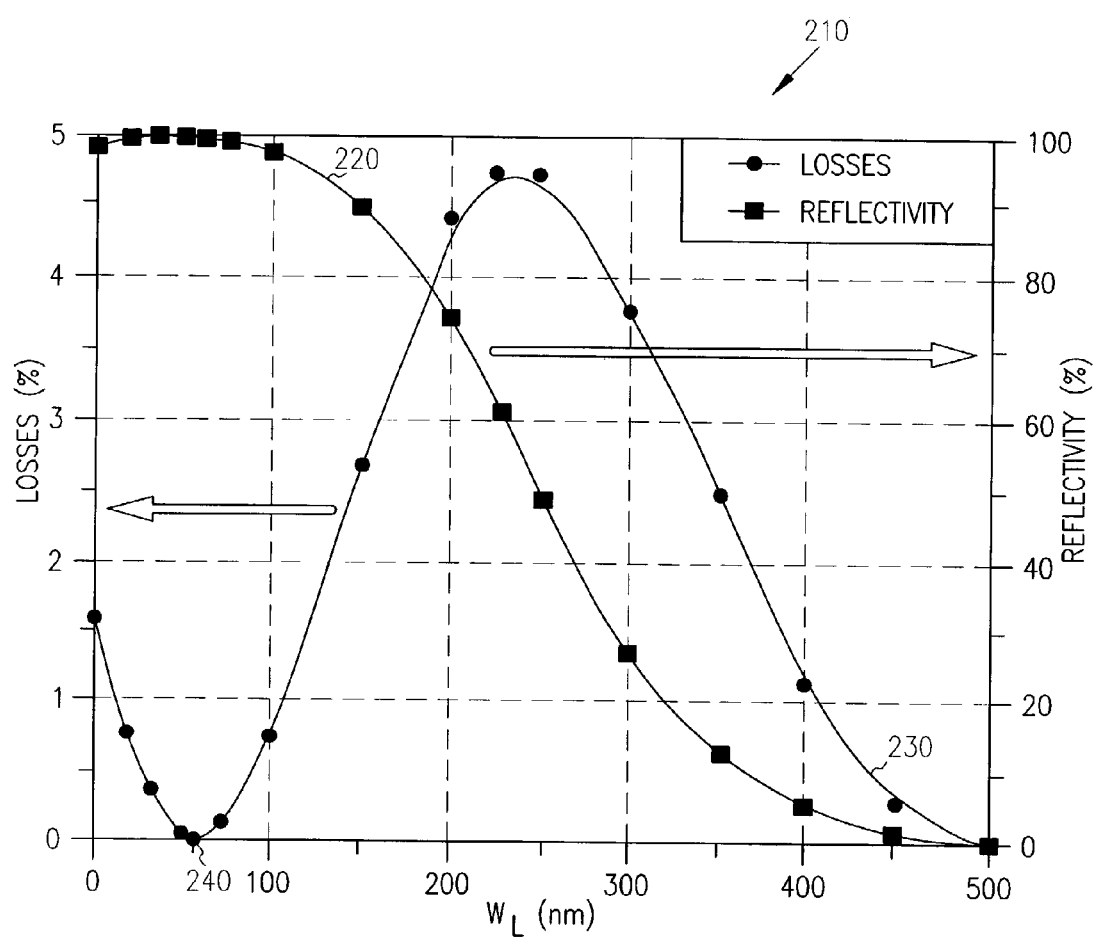
FIG. 2 is a graph showing losses and reflectivity as a width of the thin waveguide of FIG. 1 is varied.

FIG. 2 shows a graph 210 of reflectivity 220 and losses 230 for an 8 period structure while a width of the thin waveguide structures is varied at 210. The length of each thin waveguide is approximately 100 nm, and the width of the thin waveguide is varied between zero and 500 nm, the width of the waveguide. The length is varied to satisfy the condition $2(N_{h,eff} l_H + N_{L,eff} l_L)$ is equal to a wavelength, $\lambda_0$, of 1.55 um, where $N_{h,eff}$ is the effective index of refraction of the high index material, $l_H$ is the length of each section of the waveguide, $N_{L,eff}$ is the effective index of refraction of the low index material, and $l_L$ is the length of each thin waveguide. For thin waveguide widths, $W_L$, of between zero and approximately 100 nm, the reflectivity is near 100%. It drops off as the thin waveguide width increases and becomes approximately zero as the width approaches the width of the waveguide, 500 nm. The structure has losses of about 1.6% when the thin waveguide width is zero. As the thin waveguide width is increased to approximately 50 nm, the losses are practically eliminated (below 0.04%) at 240. At this width, the reflectivity is still near 100%. As the width increases, the losses also increase until about 200 nm, and then the losses decrease again.

As illustrated by the graph in FIG. 2, an optimal width or range of widths exists, where the reflectivity is near 100%, and the losses are minimal. This range can easily be found for a number of different structures, employing varying widths and lengths of waveguides and thin waveguide structures beyond the example provided. Device geometry may also vary in either two-dimensional or three-dimensional structures, while keeping the thin waveguide structure consistently significantly smaller in width or cross section respectively than that of the sections of the waveguide.

Wide bandwidth is strongly desirable in some embodiments, and is intrinsically associated with high-index contrast between high and low index sections. The same high index contrast also allows the device to achieve very desirable characteristics of high-reflectivity with only a few periods, which in turn facilitates the fabrication of very small reflectors and other devices.

As an example, a one-dimensional analogy of a two-dimensional or three-dimensional distributed Bragg reflector can be used for giving an idea of the dependency of reflectivity on index contrast. In this analogy, it is considered that alternate high and low-index sections have the effective index of the respective fundamental modes. This analogy leads to a good approximation of the real 2D or 3D structure, provided that losses are not very high. Considering that the electric or optical path length is odd multiples of $\lambda_0/4$ for each section, the following expression is obtained for the reflectivity (R) of the reflector:

$$R = 1 - \frac{2}{1 + \left(\frac{n_H}{n_L}\right)^{2p}},$$

where p is the number of periods, and $n_H$ and $n_L$ are the effective indices of the high and lo-index sections respectively. In this analogy, it is seen that the higher the index contrast, the closer the reflectivity is to the unity.

The geometry of the structure is designed in one embodiment for operating at a single spatial mode of propagation, although multimode operation is also within the scope of the invention. Geometric dimensions can be varied accordingly in order to achieve the desired spectral and loss performances for different frequencies or wavelengths of the electromagnetic spectrum. The geometry is also related to the Bragg-order of the distributed Bragg reflector through the definition of the electric of optical path length.

Any Bragg-order can be implemented using the proposed structures, leading to substantial reduction of losses. In fact, the higher the Bragg-order, the easier it is to fabricate the device as a direct consequence of the enlargement of some dimensions, but losses become even more significant by means of constructive coupling to radiation modes along specific directions. This effect opens up plenty of room for use of the proposed structure, by means of the fact that it acts just as a suppressor of diffraction losses, which are direction associated to coupling the radiation modes along the reflector.

The reflector structure is implemented not exactly periodic in one embodiment in order to adjust the spectral response as desirable. The extremity of the proposed distributed Bragg reflector structures may present any property and geometry, similar to or different from any other section inside the reflector, in order to promote the desirable effect when coupling to an external device or medium.

In one embodiment, a distributed Bragg reflector is fabricated using any dielectric material or combination of dielectric materials in order to form successive sections of high and low refractive indices. Materials such as silicon, GaAs, AlAs, InP and other III–V compounds are used in one embodiment for the high-refractive index sections. Other materials may also be used. Materials such as air, $SiO_2$, and oxides of III–V compounds may be used for the low-refractive index sections, as well as for surrounding media. Other materials, including organic materials may also be used in further embodiments.

Figure 3:
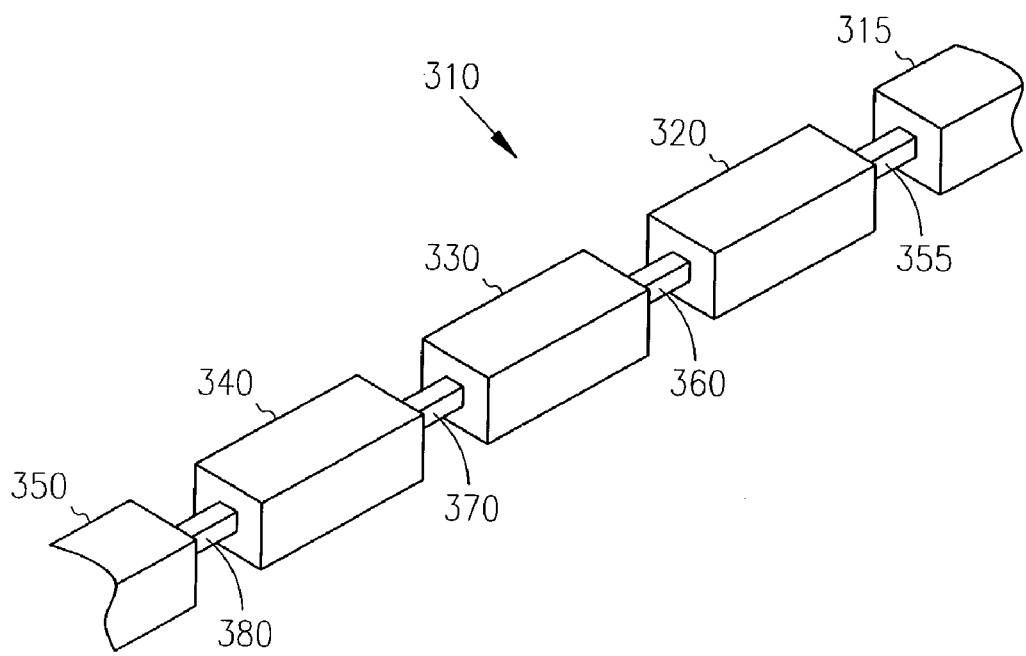
FIG. 3 is a perspective view of one example of a planar optical waveguide having thin waveguide coupled waveguide segments.
Figure 4:
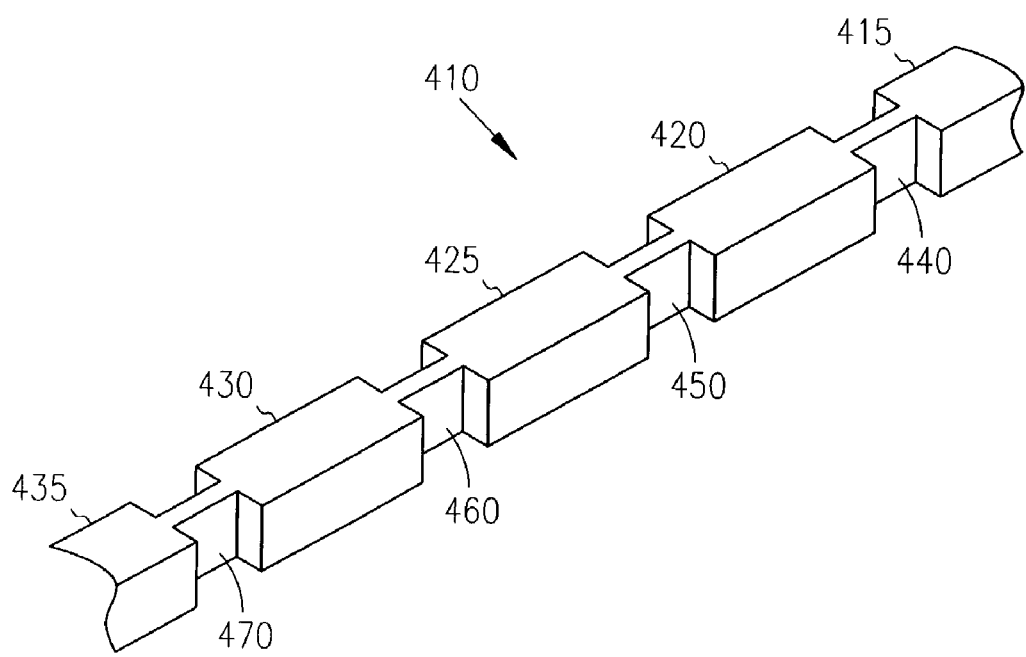
FIG. 4 is a perspective view of a further example of a planar optical waveguide having thin waveguide coupled waveguide segments.

In FIGS. 3 and 4, planar optical waveguides forming distributed Bragg reflectors are shown at 310 and 410. Reflector 310 comprises waveguide sections 315, 320, 330, 340 and 350 coupled by thin waveguides 355, 360, 370 and 380. In this case, the wires are substantially centered on each waveguide section, and have much smaller widths and heights than the waveguide sections. They are essentially floating between the sections at the geometric center of the cross section of such sections.

In FIG. 4, reflector 410 comprises waveguide sections 415, 420, 425, 430, and 435 coupled by thin waveguides 440, 450, 460 and 470. In both the waveguides, the indices of refraction for the waveguide sections and wires are high compared to medium surrounding them. The thin waveguides in this embodiment are the same height as the waveguide sections, but are much narrower. They are easily formed using a single photolithograph step to define both the waveguide sections and the thin waveguides.

The planar optical waveguides are formed on a substrate or buffer of a material with lower refractive index. The waveguides are buried in a material with lower refractive index or left with air as the upper layer. Fabrication is performed using lithographic processes (optical or e-beam) for patterning the device onto the substrate, such as silicon on insulator substrates, or another appropriate bulk or buffered substrate. Following patterning, reactive ion etching or appropriate deposition processes, depending on the type of substrate utilized, are performed to complete the device. The devices may be performed in many different manners, as the resulting structure and difference in index of refraction in surrounding medium are easily obtainable by many different processes, including those yet to be developed.

The vertical structure of FIG. 1 is formed by epitaxial growth or deposition using any process, such as MBE, CVD, MOCVD, evaporation and sputtering, as well as any other available process. Materials used are usually III–V compounds and alloys, as well as oxides thereof, but other materials may also be used. Conventional processes used for fabricating reflectors in vertical cavity surface emitting lasers are inherently appropriate for fabrication of the vertical structures. In a very conventional process, MBE is used for epitaxially growing or alternate GaAs and AlAs layers, (optical or e-beam) lithography is used for patterning the cross sectional regions, and plasma or reactive ion etching is employed for transferring the pattern. Using this example, selective etching of AlAs with respect to GaAs layers is performed as a final step in order to obtain the corresponding narrow AlAs thin waveguide layers alternated by wide high-index GaAs layers. This leads to a structure geometrically similar to that of FIG. 1, which presents a generally cylindrical cross section, although other cross section shapes may also be used.

Figure 5:
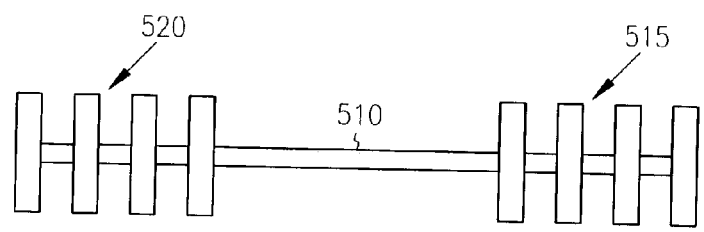
FIG. 5 is a block diagram of a waveguide coupler.

FIG. 5 shows the use of the invention to serve as a coupler between two optical fibers or between an optical fiber and another optical device. The coupler would have an optical fiber 510 in the middle (or equivalent waveguide) and a wire-lens 515 and 520 extending from each end (same material for both thin waveguide and fiber). The two thin waveguides could be different to allow coupling from a device with one mode to a device with another. Another version of the coupler could be an optical fiber (or equivalent device) with a thin waveguide (made of a material with a different refractive index) embedded in it. The ends of the thin waveguide could be either flush with the ends of the fiber or could protrude beyond it. The tapered structure between an optical tip and waveguide may also be utilized as wire-lenses 515 and 520.

In a further embodiment, an optical type fiber having embedded one or more thin waveguide structures made with a different index of refraction material than the surrounding fiber. The thin waveguide structures could be located towards the middle of the optical-type fiber or around the periphery. In one embodiment, each thin waveguide to carries a separate optical signal. The thin waveguides are spaced from each other such that signals carried on the separate thin waveguide structures would not interfere with each other nor would there be a significant loss of signal from the thin waveguide. The application of this is for telecommunications and perhaps in any optical system where simultaneous transmission of multiple separate optical signals are desired—such as an optical equivalent of multiwire cables used in computers now (for use in an optical computer). One method of making such fibers comprises arranging high and low index fibers and heating and drawing them a thin fiber of substantially parallel fibers.

Figure 6:
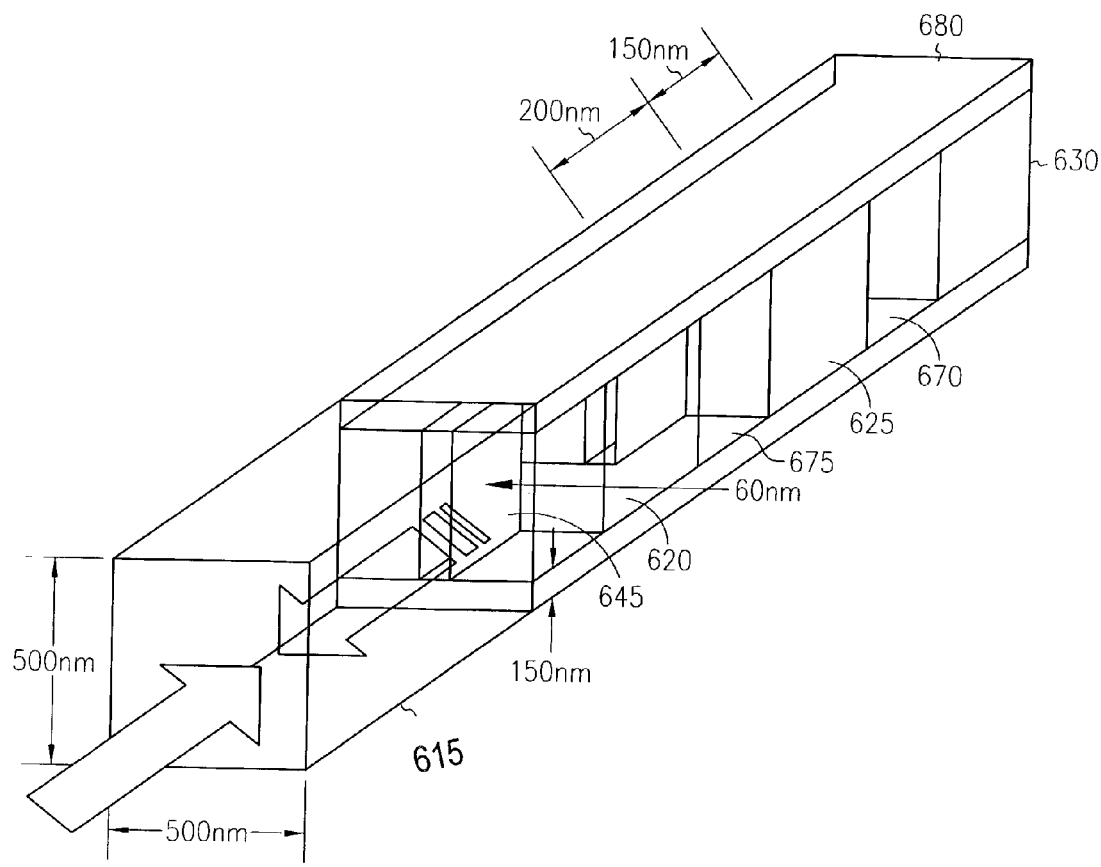
FIG. 6 is a perspective view of yet a further example of a planar optical waveguide having thin waveguides coupling waveguide segments.

FIG. 6 is a perspective view of a further waveguide formed in accordance with the present invention. A waveguide having a high index of refraction has a first end 615, and several sections of approximately equal cross section 620, 625, and 630 positioned laterally from the first end 615 of the waveguide. Section 620 is coupled to the first end 615 by a thin waveguide section 645. Section 120 and 125 are also coupled by a thin waveguide, and section 125 and section 130 are coupled by a thin waveguide, which are not visible in this view, but are substantially the same as thin waveguide section 645.

Each thin waveguide has a high index of refraction. The area between the waveguide sections is surrounded by cladding comprising medium 670 having a low index of refraction.

The waveguide sections are formed on a silicon on insulator (SIO) structure and are sandwiched between two $SiO_2$ layers 675 and 680. In one embodiment, the medium 670 is air, and in further embodiments, SiO2 is used. While the size of each of these structures may be varied depending on desired properties, the one set of dimensions is provided as just one example. Each thin waveguide section is approximately 150 nm in length, and the thicker sections 620, 625 and 630 are approximately 200 nm in length. The first end of the waveguide has a cross section of approximately 500×500 nm. The $SiO_2$ layers 675 and 680 are approximately 150 nm thick, and the thin waveguide sections such as 645 are approximately 150 nm thick.

CONCLUSION

High-index contrast distributed Bragg reflectors are used as high-reflectivity and wide-bandwidth reflectors. A high-Q resonant cavity may be formed by placing high-reflectivity mirrors at its extremities. High-index contrast reflectors enable small dimensions for high-reflectivity reflectors, allowing small and high-Q resonant cavities to be formed. Vertical-cavity surface-emitting lasers may be formed due to the ability to form small and high-Q resonant cavities in the vertical direction. Arrays of such lasers may be used in optical switching and other applications. Such an array requires small cavities, which are facilitated by the present invention. Standalone or series association of high-index contrast distributed Bragg reflectors can be used to provide filters presenting sharp and steep spectral responses. Both reflective and transmissive properties may be utilized in such filters. Yet further uses for the high-index contrast distributed Bragg reflectors enable wavelength division multiplexing by providing the ability to tailor special filters presenting sharp and steep spectral response allowing selective transmission and reflection of desired spectral ranges.

The invention claimed is:

1. A distributed Bragg reflector comprising:
   a sectioned waveguide having a high index of refraction;
   areas having a low index of refraction disposed between the sections of the waveguide; and
   thin sections having a second high index of refraction coupled between the sections of the waveguide, wherein the thickness of the thin section is greater than zero and less than approximately 100 nm.

2. The distributed Bragg reflector of claim 1, wherein the index of refraction of the waveguide sections is approximately equal to the index of refraction of the thin sections.

3. The distributed Bragg reflector of claim 1 wherein the thin sections have a cross section much smaller than the cross section of the waveguide sections.

4. The distributed Bragg reflector of claim 1 wherein the effective index of refraction of the waveguide sections is approximately 3.27 and the effective index of refraction of the areas between the waveguide sections is approximately 1.45.

5. The distributed Bragg reflector of claim 1 wherein the waveguide sections are either two dimensional or three dimensional.

6. The distributed Bragg reflector of claim 1 wherein the waveguide sections are formed from a dielectric material selected from III–V compounds.

7. The distributed Bragg reflector of claim 6 wherein the waveguide sections are formed from a dielectric material selected from the group consisting of GaAs, AlAs and InP.

8. The distributed Bragg reflector of claim 1 wherein the areas having a low index of refraction are formed from materials selected from the group consisting of oxides of III–V compounds.

9. The distributed Bragg reflector of claim 1 wherein the sectioned waveguide is disposed in a substrate in a planar or vertical manner.

10. The distributed Bragg reflector of claim 1 and further comprising mirrors placed at each end of the sectioned waveguide.

11. The distributed Bragg reflector of claim 10 and further comprising multiple such reflectors arranged in an array.

12. The distributed Bragg reflector of claim 1 wherein sizes of the elements are modified to achieve desired spectral response.

13. The distributed Bragg reflector of claim 1 wherein the thin sections have a width sized to provide high reflectivity.

14. The distributed Bragg reflector of claim 13 wherein the thin sections have a width sized to provide low losses.

15. The distributed Bragg reflector of claim 1 wherein the thickness of the thin section is approximately 50 nm.

16. A reflector comprising:
a plurality of waveguide segments spaced along an axis;
a plurality of thin segments disposed co-axially between the waveguide segments; and
a medium disposed between the waveguide segments having a lower index of refraction than an index of refraction of the waveguide and thin segments, wherein the thin segments have a length varied to satisfy the condition $2(N_{h,eff}l_H + N_{L,eff}l_L)$ is equal to a desired wavelength, $\lambda_0$ where $N_{h,eff}$ is the effective index of refraction of the segments, $l_H$ is the length of each waveguide segment, $N_{L,eff}$ is the effective index of refraction of the medium, and $l_L$ is the length of the thin segments.

17. The reflector of claim 16 wherein the medium extends to encompass waveguide segments.

18. The reflector of claim 16 wherein the thin segments have a cross section of the same shape as the cross section of the waveguide segments.

19. The reflector of claim 18 wherein the cross sections are rectangular or generally circular.

20. The reflector of claim 16 wherein the thin segments have a height approximately equal to a height of the waveguide segments, but a narrower width.

21. The reflector claim 16 wherein the thin segments are disposed approximately at the geometric center of the waveguide segments.

22. The reflector of claim 16 wherein a reflectivity, R, is approximately equal to:

$$R = 1 - \frac{2}{1 + \left(\frac{n_H}{n_L}\right)^{2p}},$$

where p is a number of periods, and $n_H$ and $n_L$ are the effective index of refraction of the waveguide and thin segments, and the index of refraction of the medium.

23. An optical device comprising:
an optical waveguide having two ends;
a pair of reflectors coupled to each end of the optical waveguide, each reflector comprising:
a plurality of waveguide segments spaced along an axis;
a plurality of thin segments disposed co-axially between the waveguide segments; and
a medium disposed between the waveguide segments having a lower index of refraction than an index of refraction of the waveguide and thin segments, wherein the thickness of the thin segments is greater than zero and less than approximately 100 nm.

24. A distributed Bragg reflector comprising:
a waveguide having coaxial, spaced thick sections with a high index of refraction;
areas having a low index of refraction disposed between the thick sections of the waveguide;
thin waveguide sections having a second high index of refraction coupled between the sections of the waveguide. wherein the thickness of the thin waveguide sections is greater than zero and less than approximately 100 nm; and
a layer of insulation disposed along a side of the thick and thin waveguide sections parallel to the axis.

25. The reflector of claim 24 and further comprising a second layer of insulation disposed along an opposite side of the thick and thin waveguide sections.

26. The reflector of claim 25 wherein the layers of insulation comprise $SiO_2$.

27. The reflector of claim 26 wherein the areas having a low index of refraction comprise $SiO_2$.

28. The reflector of claim 24 wherein the thin waveguide sections have a height approximately equal to a height of the waveguide segments.

29. A distributed Bragg reflector comprising:
a waveguide having a high index of refraction;
a portion of the waveguide having areas removed to create sections of the waveguide;
areas having a low index of refraction disposed between the sections of the waveguide; and
thin sections having a second high index of refraction coupled between the sections of the waveguide, wherein the thickness of the thin sections is greater than zero and less than approximately 100 nm.

30. The distributed Bragg reflector of claim 29, wherein the index of refraction of the waveguide sections is approximately equal to the index of refraction of the thin sections.

* * * * *